UNITED STATES PATENT OFFICE 2,552,576

AMIDOTHIOPHOSPHATES

Clarence L. Moyle, Clare, Mich., assignor to The Dow Chemical Company, Midland, Mich., a corporation of Delaware No Drawing. Application August 30, 1948, Serial No. 46,933

6 Claims. (Cl. 260—461)

This invention is directed to amidothiophosphates having the following formula

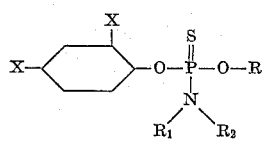

wherein one X represents a nitro radical and the other X a nitro radical or hydrogen, R represents an alkyl or alkenyl radical, $R_1$ represents hydrogen or an alkyl radical and $R_2$ represents an alkyl radical.

These new amidothiophosphate products are valuable as constituents of insecticide and fungicide compositions. They may also be employed as intermediates for the preparation of more complex organic derivatives, as modifiers in plastic compositions and as constituents of extreme pressure lubricants. The products are oils or crystalline solids, somewhat soluble in many organic solvents, substantially insoluble in water, not appreciably affected by carbon dioxide, stable to light and air and non-corrosive to the skin of man and higher animals.

Various methods may be employed for preparing the new amidothiaphosphates. A preferred procedure for preparing the products consists of reacting an anhydrous alkali metal salt of 2-nitrophenol, 4-nitrophenol or 2,4-dinitrophenol and an alkali metal monohydric alcoholate with an N-substituted dichlorothiophosphoramide having the formula

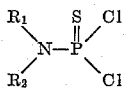

wherein $R_1$ represents hydrogen or an alkyl radical and $R_2$ represents an alkyl radical. The reaction may be carried out in an inert organic solvent and conveniently in an excess of the alcohol employed in the preparation of the alcoholate. Substantially equimolecular proportions of the reactants have been found to give the amidothiophosphate products in good yields. The nitrophenolate and alcoholate are successively reacted portionwise with the dichlorothiophosphoramide at a temperature of from 30° to 110° C., the optimal temperature depending somewhat upon the particular reactants employed and the solvent in which the reaction is carried out. The reaction is exothermic and temperature control is obtained by regulation of the rate of addition of the reactants as well as by the addition and subtraction of heat, if required. Following the reaction, the amidothiophosphate product is separated by conventional means.

In a representative preparation, 1 mol of sodium and 1 mol of a nitrophenol are reacted together in an inert solvent and preferably in the alcohol subsequently to be employed in the preparation of the alcoholate. The resulting phenolate product is added portionwise to 1 mol of an N-substituted dichlorothiophosphoramide, and the mixture thereafter warmed for a short period of time at a temperature of between 45° and 70° C. The reaction mixture is then cooled to room temperature, 1 mol of sodium dissolved in an excess of the desired alcohol added portionwise, and the mixture again warmed for a short time between 40° to 70° C. to complete the reaction. Excess alcohol is removed by evaporation and the residue containing the reaction product dissolved in a non-reactive water-immiscible organic solvent such as carbon tetrachloride, diethyl ether, benzene or methylene dichloride. The resultant solution is successively washed with dilute aqueous sodium or ammonium hydroxide and water, and dried with anhydrous sodium sulphate. The amidothiophosphate product is then separated by evaporation of the methylene dichloride or recrystallization from organic solvents. In an alternative procedure, the order of addition of the phenolate and alcoholate is reversed and the alcoholate is reacted with the N-substituted dichlorothiophosphoramide and the phenolate with the resulting intermediate product. The conditions of reaction and methods of separation are essentially as previously described.

The N-substituted dichlorothiophosphoramides employed as starting materials, as above described, may be prepared by reacting a hydrochloride of a mono- or dialkyl amine with an excess of thiophosphoryl chloride ($PSCl_3$). Good yields are obtained in preparations employing from 2 to 4 molecular proportions of thiophosphoryl chloride per molecular proportion of amine salt. The reaction is carried out at the boiling temperature of the reaction mixture and is accompanied by the evolution of hydrogen chloride. Following the reaction, the mixture is fractionally distilled under reduced pressure to obtain the N-substituted dichlorothiophosphoramide.

Example 1.—O-4-nitrophenyl O-ethyl N,N-dimethylamidothiophosphate

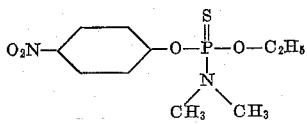

1.85 grams (0.08 mol) of sodium and 11.1 grams (0.08 mol) of 4-nitrophenol were reacted together in 43 grams of methyl alcohol and the resulting product added portionwise over a period of 5 minutes to 14.25 grams (0.08 mol) of N,N-dimethyl dichlorothiophosphoramide dispersed in 36 grams of diethyl ether. The addition was carried out at a temperature of 22° C. The ether was then removed by evaporation and the residue warmed for 5 minutes at 70° to 75° C. The vessel and contents were then cooled to room temperature and 1.85 grams (0.08 mol) of sodium dissolved in 43 grams (1.34 mols) of methyl alcohol added portionwise. The mixture was then warmed for 10 minutes at 55° to 60° C. to complete the reaction. The crude reaction product was washed with dilute aqueous ammonium hydroxide and the organic products of reaction extracted with methylene dichloride. This solvent extract was successively washed with dilute aqueous ammonium hydroxide and water, and dried with anhydrous sodium sulphate. The solvent was then removed by evaporation to obtain an O-4-nitrophenyl O-ethyl N,N-dimethylamidothiophosphate product as a brown oil having a refractive index $n/D$ of 1.5455. Upon standing, this product slowly solidified to give a crystalline solid, which was recrystallized from methyl alcohol and found to have a melting point of 133° C.

Example 2.—O-4-nitrophenyl O-ethyl N,N-diethylamidothiophosphate

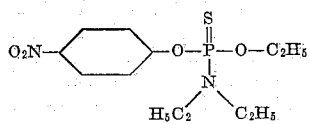

3 grams (0.13 mol) of sodium and 18.1 grams (0.13 mol) of 4-nitrophenol were reacted together in 158 grams of ethyl alcohol. This product was added portionwise over a period of 20 minutes to 26.7 grams (0.13 mol) of N,N-diethyl dichlorothiophosphoramide dispersed in 78.9 grams of ethyl alcohol. The temperature rose to 75° C. during the addition. Stirring was continued and the mixture warmed at this temperature for 30 minutes and thereafter cooled to 30° C. 3 grams (0.13 mol) of sodium dissolved in 125 grams (2.15 mols) of ethyl alcohol was added portionwise to the above product and the resulting mixture warmed for 5 minutes at 55° C. to complete the reaction. The crude mixture was then filtered and the filtrate washed with a saturated aqueous solution of sodium chloride. The organic products of reaction were extracted with diethyl ether and the ether extract washed with dilute aqueous ammonium hydroxide saturated with sodium chloride. The several wash waters were also extracted with diethyl ether. The ether extracts were then combined, washed with water and dried with anhydrous sodium sulphate. The solvent was removed by evaporation to obtain an O-4-nitrophenyl O-ethyl N,N-diethylamidothiophosphate product as an orange oil having a density of 1.16 at 25° C. and a refractive index $n/D$ of 1.5368 at 35° C.

Example 3.—O-4-nitrophenyl O-ethyl N-ethylamidothiophosphate

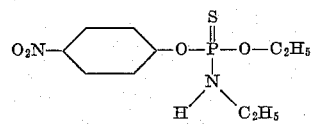

3 grams (0.13 mol) of sodium and 18.1 grams (0.13 mol) of 4-nitrophenol were reacted together in 99 grams of ethyl alcohol. This alcoholic phenolate was added portionwise over a period of 10 minutes to 23.2 grams (0.13 mol) of N-ethyl dichlorothiophosphoramide dispersed in 59 grams of ethyl alcohol. The addition was carried out at a temperature of 40° to 50° C., and the resulting mixture warmed for 10 minutes at 55° C. and cooled to room temperature. 3 grams (0.13 mol) of sodium dissolved in 99 grams (2.15 mols) of ethyl alcohol was added portionwise over a period of 15 minutes to the above product. The excess ethyl alcohol was then removed by evaporation and the residue dispersed in methylene dichloride. This solvent mixture was successively washed with dilute aqueous ammonium hydroxide and water, and dried over anhydrous sodium sulphate. The methylene dichloride was then removed by evaporation to obtain an O-4-nitrophenyl O-ethyl N-ethylamidothiophosphate product as a brown oil having a density of 1.14 at 25° C. and a refractive index $n/D$ of 1.4940 at 35° C.

Example 4.—O-4-nitrophenyl O-ethyl N-methylamidothiophosphate

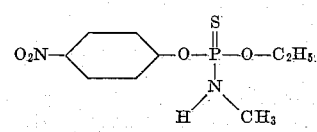

1.035 grams (0.045 mol) of sodium and 6.27 grams (0.045 mol) of 4-nitrophenol were reacted together in ethyl alcohol and this product added portionwise over a period of 5 minutes to 7.42 grams (0.045 mol) of N-methyl dichlorothiophosphoramide dispersed in ethyl alcohol. The addition was carried out at 45° C. and the resulting mixture thereafter warmed to 60° C. The reaction vessel and contents were cooled to 40° C. and 1.035 grams (0.045 mol) of sodium dissolved in a molecular excess of ethyl alcohol added portionwise over a period of 5 minutes. The mixture was then warmed for 10 minutes at 50° to 55° C. to complete the reaction. The excess ethyl alcohol was removed by evaporation and the residue dispersed in benzene. This solvent mixture was processed as described in Example 3 to obtain an O-4-nitrophenyl O-ethyl N-methylamidothiophosphate product. The latter was a brown oil having a density of 1.16 at 25° C. and a refractive index $n/D$ of 1.5162 at 35° C.

Example 5

2.3 grams (0.1 mol) of sodium and 13.9 grams (0.1 mol) of 4-nitrophenol were reacted together in ethyl alcohol. This alcoholic dispersion was added portionwise over a period of 10 minutes to 19.2 grams (0.1 mol) of N-isopropyl dichlorothiophosphoramide dispersed in benzene. The addition was carried out at 70° C., and the mixture thereafter warmed for 10 minutes at this temperature and cooled to 35° C. 2.3 grams (0.1 mol) of sodium dissolved in a molecular excess of ethyl alcohol was added portionwise over a period of 5 minutes. The temperature rose to 43°

C. during the addition and was subsequently brought to 70° C. for 15 minutes to complete the reaction. About ½ of the benzene and excess ethyl alcohol was then removed by evaporation and the residue dispersed in water. This mixture was extracted with benzene and the solvent extract processed as described in Example 1 to obtain an O-4-nitrophenyl O-ethyl N-isopropylamidothiophosphate product. The latter was a brown oil having a density of 1.07 at 25° C. and a refractive index $n/D$ of 1.4879 at 35° C.

Example 6

In a similar manner, 4.6 grams (0.2 mol) of sodium, 13.9 grams (0.1 mol) of 2-nitrophenol, 99 grams (2.15 mols) of ethyl alcohol and 19.2 grams (0.1 mol) of N-isopropyl dichlorothiophosphoramide were reacted together to obtain an O-2-nitrophenyl O-ethyl N-isopropylamidothiophosphate product. This product was a brown oil having a density of 1.10 at 25° C. and a refractive index $n/D$ of 1.4798 at 35° C.

Example 7

2.3 grams (0.1 mol) of sodium and 18.4 grams (0.1 mol) of 2,4-dinitrophenol were reacted together in ethyl alcohol and the resulting product added portionwise over a period of 15 minutes to 19.2 grams (0.1 mol) of N-isopropyl dichlorothiophosphoramide dispersed in ethyl alcohol. The addition was carried out at a temperature of 65° to 70° C. and with subsequent warming for 10 minutes at 70° C. The vessel and contents were then cooled to 50° C., 2.3 grams (0.1 mol) of sodium dissolved in a molecular excess of alcohol added portionwise, and the resulting mixture warmed for 5 minutes at 65° C. The separation was carried out as described in Example 3 to obtain an O-2,4-dinitrophenyl O-ethyl N-isopropylamidothiophosphate product as a brown oil having a density of 1.29 at 25° C. and a refractive index $n/D$ of 1.5539 at 35° C.

Example 8

1.38 grams (0.06 mol) of sodium and 8.35 grams (0.06 mol) of 4-nitrophenol were reacted together in methyl alcohol. This alcoholic phenolate was added portionwise over a period of 5 minutes to 12.4 grams (0.06 mol) of N-normalbutyl dichlorothiophosphoramide. The addition was carried out at 50° to 60° C. and the mixture thereafter warmed for 5 minutes at 60° C. 1.38 grams (0.06 mol) of sodium dissolved in a molecular excess of methyl alcohol was added portionwise over a period of 5 minutes and at a reaction temperature of 50° to 60° C. The reactor and contents were thereafter warmed for 5 minutes at 60° C. to complete the reaction. The separation was made in a manner similar to that of Example 3 to obtain an O-4-nitrophenyl O-methyl N-normalbutylamidothiophosphate product. The latter was a dark brown oil having a density of 1.11 at 28° C. and a refractive index $n/D$ of 1.4970 at 35° C.

Example 9

2.3 grams (0.1 mol) of sodium and 13.9 grams of 4-nitrophenol were reacted together in allyl alcohol. This product was added portionwise to 17.8 grams (0.1 mol) of N,N-dimethyl dichlorothiophosphoramide dispersed in allyl alcohol. The reactor and contents were thereafter warmed for 5 minutes at 50° to 55° C. and then for 5 minutes at 60° to 65° C. 2.3 grams (0.1 mol) of sodium dissolved in a molecular excess of allyl alcohol was added portionwise to the above intermediate product and the resulting mixture warmed for 5 minutes at 65° to 70° C. to complete the reaction. The separation was accomplished as described in Example 3 to obtain an O-4-nitrophenyl O-allyl N,N-dimethylamidothiophosphate product as an orange oil having a density of 1.16 at 31° C. and a refractive index $n/D$ of 1.5388 at 35° C.

Example 10

1.38 grams (0.06 mol) of sodium and 8.35 grams (0.06 mol) of 4-nitrophenol were reacted together in secondary-butyl alcohol and this dispersion added portionwise over a period of 4 minutes to 10.7 grams (0.06 mol) of N-ethyl dichlorothiophosphoramide. The temperature was maintained at 50° to 55° C. during the addition. The mixture was then warmed for 5 minutes at 55° to 60° C. and cooled to 50° C. 1.38 grams (0.06 mol) of sodium dissolved in a molecular excess of secondarybutyl alcohol was added portionwise over a period of 3 minutes to the above product, and the resulting mixture warmed for 5 minutes at 55° to 60° C. to complete the reaction. The crude product was then dispersed in benzene and the benzene mixture successively washed with dilute aqueous ammonium hydroxide and water, and dried with anhydrous sodium sulphate. The solvent was removed by evaporation to obtain an O-4-nitrophenyl O-secondarybutyl N-ethylamidothiophosphate product as a dark brown oil having a refractive index $n/D$ of 1.4755 at 37.5° C.

In a similar manner, other amidothiophosphates may be prepared of which the following are representative:

O-2-nitrophenyl O-normalhexyl N-normaldecylamidothiophosphate by reacting together the sodium salt of normalhexyl alcohol, sodium 2-nitrophenolate and N-normaldecyl dichlorothiophosphoramide.

O-2,4-dinitrophenyl O-normalhexylamidothiophosphate by reacting together the sodium salt of normalhexyl alcohol, sodium 2,4-dinitrophenolate and N-normalhexyl dichlorothiophosphoramide.

O-4-nitrophenyl O-normaloctyl N-normaldodecylamidothiophosphate by reacting together the sodium salt of normaloctyl alcohol, sodium 4-nitrophenolate and N-normaldodecyl dichlorothiophosphoramide.

O-2,4-dinitrophenyl O-secondarybutyl N-secondarybutylamidothiophosphate by reacting together the sodium salt of secondarybutyl alcohol, sodium 2,4-dinitrophenolate and N-secondarybutyl dichlorothiophosphoramide.

O-4-nitrophenyl O-normaldodecyl N,N-dinormalbutylamidothiophosphate by reacting together the sodium salt of normaldodecyl alcohol, sodium 4-nitrophenolate and N,N-dinormalbutyl dichlorothiophosphoramide.

O-2-nitrophenyl O-ethyl N-normaloctyl-N-normalbutylamidothiophosphate by reacting together the sodium salt of ethyl alcohol, sodium 2-nitrophenolate and N-normaloctyl-N-normalbutyl dichlorothiophosphoramide.

O-2-nitrophenyl O-2-methylallyl N-normaldecylamidothiophosphate by reacting together the sodium salt of 2-methylallyl alcohol, sodium 2-nitrophenolate and N-normaldecyl dichlorothiophosphoramide.

O-2,4-dinitrophenyl O-2-butenyl N-ethylamidothiophosphate reacting together the sodium salt of 2-butenyl alcohol, sodium 2,4-dinitrophenolate and N-ethyl dichlorothiophosphor-amide.

It has been found that the new amidothiophosphate products are valuable as insecticide and fungicide toxicants and may be applied to vegetation for the control of a wide range of insect, mite and fungus pests with negligible injury to the host plant. The new products may be employed as constituents of insecticide and fungicide concentrates or incorporated directly into dust or spray compositions. For example, the products may be compounded with finely divided inert solids to form concentrate dusts. Such mixtures may be dispersed in water with the aid of a wetting agent and the resulting aqueous suspensions employed as sprays. In other procedures, the toxicants may be employed in oils, as constituents of oil in water emulsions or in water dispersions with or without the addition of wetting, dispersing or emulsifying agents.

The products of the preceding examples have been tested against two-spotted spider mite, bean aphid and Mexican bean beetle. In representative operations against such organisms, 100 per cent controls have been obtained with aqueous spray compositions containing from 0.25 to 3 pounds of the toxicant per 100 gallons of spray mixture. The products have also been tested for the control of American roach nymphs and confused flour beetles. 100 per cent controls of American roach nymphs have been obtained in 2 days and of confused flour beetles in 7 days by allowing the insects to feed upon white flour containing 1 per cent by weight of the toxicants.

In a representative operation, 50 parts by weight of O-4-nitrophenyl O-ethyl N,N-dimethylamidothiophosphate, 8.3 parts of a dimeric alkylated aryl polyether alcohol (Triton X-155) and 41.7 parts of xylene were mixed together. This composition was dispersed in water to form aqueous sprays containing various amounts of the toxicant. When these spray compositions were employed against two-spotted spider mite, Mexican bean beetle and bean mildew 100 percent controls were obtained at toxicant concentrations per 100 gallons of spray mixture of 0.25, 0.5 and 1.0 pound, respectively.

I claim:
1. An amidothiophosphate having the formula

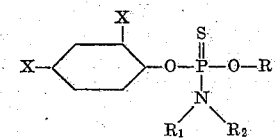

wherein one X represents a nitro radical and the other X represents a member of the group consisting of hydrogen and a nitro radical, R represents a member of the group consisting of alkenyl and alkyl radicals, $R_1$ represents a member of the group consisting of hydrogen and alkyl radicals and $R_2$ represents an alkyl radical.

2. O-4-nitrophenyl O-ethyl N-methylamidothiophosphate.
3. O-4-nitrophenyl O-ethyl N-ethylamidothiophosphate.
4. O-4-nitrophenyl O-ethyl N,N-dimethylamidothiophosphate.
5. O-4-nitrophenyl O-ethyl N-isopropylamidothiophosphate.
6. O-4-nitrophenyl O-secondarybutyl N-ethylamidothiophosphate.

CLARENCE L. MOYLE.

REFERENCES CITED

The following references are of record in the file of this patent:

UNITED STATES PATENTS

| Number | Name | Date |
|---|---|---|
| 2,146,584 | Lipkin | Feb. 7, 1939 |
| 2,172,241 | Dickey et al. | Sept. 5, 1939 |

FOREIGN PATENTS

| Number | Country | Date |
|---|---|---|
| 500,386 | Great Britain | Feb. 8, 1939 |

OTHER REFERENCES

Autenrieth et al.: "Ber. deutsch. chem. Ges.," vol. 31 (1898) pp. 1094–1100.

Strecker et al.: "Ber. deutsch. chem. Ges.," vol. 49 (1916) pp. 63–87.

FIAT Final Report 949 "Organic Chemical Intermediates for Insecticides, Fungicides and Rodenticides" by Thurston. OTS publication No. PB-60890, released May 30, 1947, pages 19–20.